Sept. 15, 1931.  R. C. BENNER  1,823,780
BATTERY CHARGING SYSTEM
Filed June 28, 1924  2 Sheets-Sheet 1

Patented Sept. 15, 1931

1,823,780

UNITED STATES PATENT OFFICE

RAYMOND C. BENNER, OF BAYSIDE, NEW YORK, ASSIGNOR TO UNION CARBIDE & CARBON RESEARCH LABORATORIES, INCORPORATED

BATTERY CHARGING SYSTEM

Application filed June 28, 1924. Serial No. 723,050.

This invention relates to battery charging systems, and more particularly to an improved system for recharging storage and other rechargeable batteries employed as B-batteries of radio receiving sets, though certain features of this invention are of more general application.

Because of the heavier drains and higher voltages required of the B-battery in some types of radio receiving sets, it has become desirable to employ a rechargeable battery, such as a storage battery, rather than the usual dry battery, for the source of B-battery current. Such rechargeable batteries are not especially popular with the average radio set owner, partly because of the inconvenience involved in recharging them.

The present invention aims to provide a charging system by means of which a storage or other battery may be readily charged from the usual house-lighting circuit and whereby, when the battery is up to fully charged condition, the battery charging current is automatically substantially cut off or reduced to a small fraction of what the charging current is when the battery is in a partially charged condition, so that but little skill or attention are required in recharging the battery and the later may be easily kept in fully charged condition. A further object of this invention is to provide a charging system that is particularly applicable to a storage B-battery in circuit with an audion detector or a stage of amplification of a radio receiving circuit.

Figure 1:
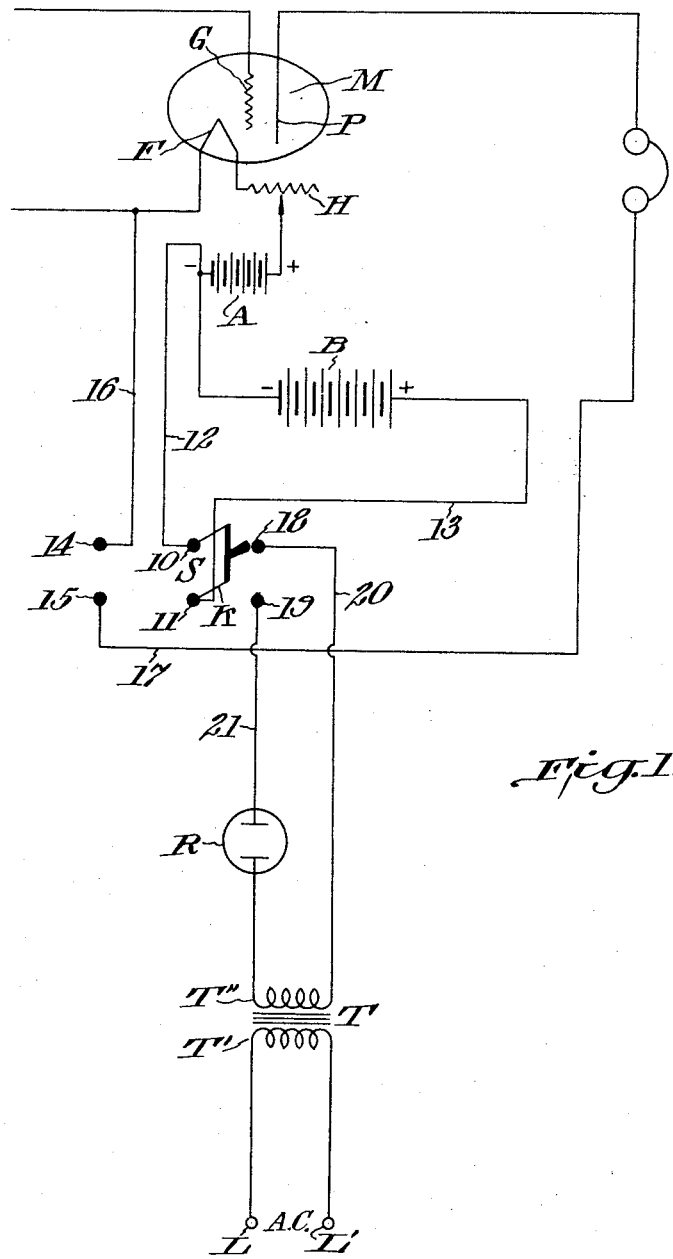
Figure 2:
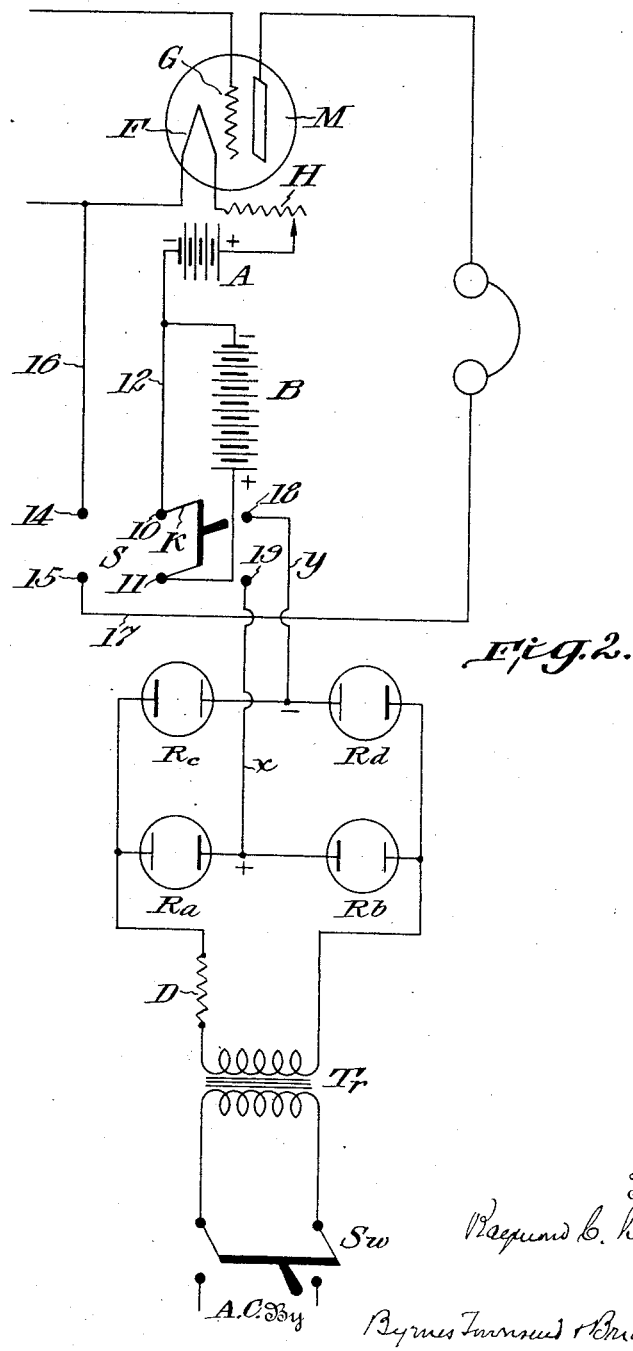

The above and other objects and the novel features of the invention will be apparent from the following description taken in connection with the accompanying drawings in which Fig. 1 diagrammatically illustrates a portion of a receiving circuit and an associated charging system embodying this invention; and Fig. 2 is a diagram illustrating a modification of this invention.

Broadly speaking, the improved charging system comprises a battery that is conductively connected to a source of alternating current through rectifying means and a transformer or other means constructed and arranged so that the charging current will be substantially cut off at a predetermined counter E. M. F. of the battery, desirably that of the battery when substantially fully charged. When applied to the circuit of an audion detector or stage of amplification using a B-battery and an A-battery, the charging circuit desirably includes switch means which in one position completes the B-battery and A-battery circuits, and in another position opens the A-battery circuit and connects the B-battery across the charging means.

For the purpose of illustrating this invention, the improved charging system is designed for connection to the usual 110 volt alternating current house-lighting circuit, but its application is of course not limited to such source of current. A storage B-battery or other rechargeable battery may be employed, the size and voltage of which may vary and, as diagrammatically shown in Fig. 1 for example, may consist of 24 storage cells in series designed to provide a terminal voltage of about 47 volts when discharged and about 53 volts when fully charged. Suitable potential reducing means, such as a step-down transformer T having primary and secondary windings T', T'', must be connected in circuit between the 110 volt alternating current supply terminals L, L' and the terminals of the storage B-battery to appropriately reduce the supply voltage to a value near the battery voltage. The primary and secondary of the transformer T are therefore wound so as to obtain approximately a 2 to 1 reduction in voltage and the secondary winding T'' is connected in series circuit through a rectifier R with the battery. In the present example, the transformer windings are so proportioned that if the B-battery were practically discharged and had a terminal voltage of about 47, the secondary voltage of the transformer would be about 53 volts: and if the B-battery were fully charged its terminal voltage would be about 53 volts. Thus, the B-battery would have a counter E. M. F. sufficiently near the voltage impressed by the transformed secondary to substantially cut off the flow of charging current i. e., under normal working conditions, the counter E. M. F. of the battery when substantially charged is sufficient to practically balance the impressed E. M. F. of the charging current and automatically shut off the latter. The B-battery counter E. M. F. will of course drop after a current drain, whereupon charging will automatically resume and continue until the condition of balance again obtains.

Inasmuch as an alternating current supply is used, suitable rectifying means is required in series with the transformer secondary winding and the B-battery. As shown, an electrolytic rectifier R may be employed to rectify the secondary current and supply direct current for charging the battery. Various types of electrolytic rectifiers may be employed, such as those disclosed in an application Serial No. 723,049 filed in my name and an application Serial No. 723,030 filed by Glen D. Bagley and Fred T. Bowditch.

As illustrated, the B-battery is designed to be included in the plate circuit of one or more vacuum or audion tubes such as M which may be a detector or an amplifying tube, and which has an A-battery, about 6-volt storage or other type, connected through a suitable rheostat H to heat its filament F. Inasmuch as the voltage of the charging circuit and B-battery is often 100-110 and higher, and invariably greatly exceeds the 6-volts of the A-battery filament circuit, to safeguard the filament F, it is desirable to so arrange the control of the A-battery and B-battery circuits that the A-battery-filament circuit shall always be open when the charging circuit is completed through the B-battery. A convenient means for insuring this comprises a double-pole double-throw knife switch S. The middle switch terminals 10 and 11 connected to the knife blades are respectively connected by a conductor 12 to the negative terminal of the A-battery and the negative terminal of the B-battery, and by a conductor 13 to the positive terminal of the B-battery. The pair of switch terminals 14 and 15 are respectively connected by conductors 16 and 17 to the filament F and to the ear phones E; and the switch terminals 18 and 19 are respectively connected through conductors 20 and 21 in series with the transformer secondary T″ and the rectifier R. Accordingly, when the switch blades K are in position to conductively connect the terminals 10—14, and 11—15, the A-battery and B-battery are connected in circuit with the filament F and plate P of the tube M; whereas, when the switch blades K close the circuit between the contacts 10—18 and 11—19, the A-battery-filament circuit is opened and the B-battery is connected to the charging circuit. The charging of the B-battery will then proceed until the counter E. M. F. of the B-battery is substantially equal to or slightly exceeds the voltage impressed by the charging circuit at the battery terminals, whereupon charging of the B-battery is automatically substantially cut off, without the necessity of opening the switch S to electrically disconnect the charging circuit from the B-battery. By this arrangement the B-battery may be conveniently charged without removing it from the radio receiving set and without special skill or close attention; but the B-battery may not be charged while the A-battery-filament circuit is closed, thus protecting the tube or tubes M. Moreover, by switching off the A-battery after each period of using the radio set and then switching the B-battery into the charging circuit, such B-battery may be readily kept practically fully charged and in good working condition for the next period of service. Nor is it necessary to electrically disconnect the alternating current supply from the rectifier, which is advantageous in that it maintains a current impressed on the rectifier cells and keeps them in better condition.

The B-battery to be charged may be a storage battery of the ordinary plate type or of the type disclosed in an application Serial No. 696,029, filed in my name. This battery need not be more than a 1 ampere hour battery for a radio receiving set requiring a maximum of 30 milli-amperes current, and may be fully charged in 60 hours at a 20 milli-ampere rate. A smaller size B-battery than now generally used will thus be sufficient for the usual radio set and, when once charged, a comparatively short period of recharging will substantially replace the average drain.

Other types of rechargeable batteries may also be employed in place of a storage battery. For example, dry cells, such as those having zinc and carbon electrodes and containing ammonium chloride, zinc chloride and manganese dioxide, and caustic soda cells such as those having zinc and copper oxide electrodes in a caustic soda electrolyte, have, in a small degree, the properties of a storage cell, but not to such an extent that it is commercially practicable to recharge these cells under the ordinary conditions. However, if only a small amount of the total capacity of a battery of such cells is used at a time, as in the average radio receiving set, a charging device may be connected in circuit therewith according to this invention to replace such small current drain, and a current efficiency may be obtained thereby which renders such recharging practicable.

The B-battery or other battery to be charged may be of a higher voltage than already indicated, in which event, the voltage of the rectified current applied to the battery terminals by the charging means should be of such value that there will be a current flow into the battery when it is discharged, and the high counter E. M. F. of the charged battery should be of such value that the charging current will be substantially automatically cut off thereby, without electrical disconnection of said battery from the supply of charging current. Where the battery voltage consists of 48 cells having a voltage of about 2.2 or 2.3 volts each when fully charged, no transformer is required when charging from a 110 volt alternating current circuit, but the automatic shut-off action will occur in the same manner. However, in such arrangement, a suitable resistance is desirably inserted in series with the battery and rectifier to protect the latter against excessive current flow while the film is forming therein after a period of idleness. Such resistance may be similarly inserted in the charging circuit employing a transformer. Furthermore, the transformer T may be of the step-up type to deliver a higher voltage at the charging terminals 18, 19, when a higher voltage storage battery is to be charged, such storage battery similarly developing a counter E. M. F. when fully charged that is sufficient to substantially cut off the charging current.

When an electrolytic rectifier is used in the charging circuit, the maximum charging voltage that may be delivered to the battery is determined by the breakdown voltage of the electrolytic film on the filming electrode. For example, the breakdown voltage of the film on an aluminum electrode is about 185 volts and that on a tantalum electrode is about 85 volts. When a tantalum-lead-sulfuric-acid rectifier is used and the charging voltage exceeds the breakdown voltage of the film on the tantalum electrode, two or more of such rectifiers are desirably connected in series in the charging circuit, thus avoiding the limitation of the single film.

Furthermore, under conditions which make it desirably to rectify both halves of the alternating current wave, pairs of electrolytic rectifiers may be connected in series-parallel circuit with the alternating current supply and the battery to be charged, the voltage of the latter being such that its counter E. M. F. when fully charged will automatically substantially cut off the charging current, or at any rate, reduce such charging current to a small fraction of the value of the charging current when the battery is in a partially charged condition.

As diagrammatically illustrated in Fig. 2, four aluminum-carbon or other type electrolytic rectifiers are connected in circuit between the alternating current supply line and the battery to be charged. The rectifiers R$a$, R$b$ and R$c$, R$d$ are bridged in pairs and in opposed relation across the alternating current supply line, and the leads $x$, $y$ from points between the pairs of rectifiers may be connected directly to a battery to be charged or through the switch S to the B-battery in the tube circuit shown. Where a battery of about 100 volts is to be charged from the usual 110 volt A. C. line, the transformer T$r$ may be omitted and the alternating current line may be directly connected through a switch S$w$ and a series resistance D to the rectifier circuit shown. Where the battery voltage is considerably higher or lower than the voltage of the alternating current supply line, a step-up or step-down transformer of appropriate ratio will be employed as indicated, wound as already explained, so that the counter E. M. F. of the battery, when fully charged by the such charging arrangement, will automatically substantially cut off the charging current,—at any rate such charging current will be reduced to a small fraction of what the charging current would be when the battery is in a partially charged condition, thereby eliminating the necessity of disconnecting the battery from the charging circuit, and avoiding the need of disconnecting the rectifier means from the supply line. Since overcharging the storage B-battery is practically avoided by this charging method, decided advantages and economy are effected in the operation of the B-battery; e. g., peroxidation of the positive storage battery grids is prevented and it is not necessary to add water to the electroyte as often as usual. Since the battery is not allowed to completely discharge or stand idle without current applied, sulfating is prevented. The battery, charged according to the present method, thus requires less attention and gives a longer life and better performance than ordinarily.

In the circuit arrangement illustrated in Fig. 2, the switch S$w$ may be kept closed and the alternating current supply line may be left connected to the rectifiers while the B-battery is disconnected from the rectifiers and in service. It is then only necessary to close the switch S onto the contacts 18, 19 to begin recharging the battery. By leaving the alternating current supply connected to the rectifiers, the rectifying films of the latter are maintained in better condition while the rectifier means is idle. Frequently, after a period of idleness, when two or more chemical rectifiers of the usual type are connected in series in a charging circuit, one rectifier tends to form more rapidly than the other and then carries the greater part of the load, which causes sparking at the film and rapidly destroys the operating rectifier. The four-cell rectifier disclosed has the important advantage that it may be used to successfully charge a higher voltage battery, such as a 48 cell B-battery directly from a 110 volt alternating current line, without breaking down the rectifying films; the connections as shown in Fig. 2 being such that the films of all rectifiers will automatically stay formed when the latter are left connected to the alternating current supply, and any of the films will at once re-form if it has deteriorated during a long period of idleness.

In some cases during service or non-charging periods, it may be desirable to shut off the alternating current and disconnect the battery from the rectifier; or the alterating current may be shut off when the battery is being discharged and left connected to the rectifier. Other changes may be made in the arrangements disclosed, without departing from the scope of the invention as defined by the appended claims.

I claim:

1. The combination of a vacuum tube comprising a filament and a plate, means for electrically heating said filament, a rechargeable B-battery in circuit with said plate, charging means for said B-battery, and means operable to close the B-battery charging circuit only after first interrupting such filament heating means.

2. The combination of a detector or amplifier tube comprising a filament and a plate, an A-battery in circuit with said filament, a rechargeable B-battery in circuit with said plate, charging means for said B-battery, and switch means operable to close the B-battery charging circuit only after first interrupting such A-battery-filament circuit.

3. The combination of a vacuum tube comprising a filament and a plate, an A-battery in circuit with said filament, a rechargeable B-battery in circuit with said plate, charging means for said B-battery, and switch means operable to first open the A-battery-filament and B-battery-plate circuits and then close the B-battery-charging circuit, and vice versa.

4. The combination of a vacuum tube comprising a filament and a plate; an A-battery of relatively low voltage in circuit with said filament; a rechargeable B-battery of substantially higher voltage than said A-battery in circuit with said plate; charging means for said B-battery comprising a source of alternating current of materially higher voltage than said A-battery and rectifying means in circuit with said source of current and said B-battery and arranged to supply charging current to the latter, said charging current having substantially the same voltage as said B-battery when the latter is substantially fully charged; and means operable to close the B-battery charging circuit only after first interrupting such A-battery-filament circuit.

5. The combination of a vacuum tube comprising a filament and a plate; means for electrically heating said filament; a rechargeable B-battery in circuit with said plate; charging means for said B-battery comprising a source of alternating current of materially higher voltage than such electrical heating means and a rectifier adapted to rectify such alternating current, such charging current having substantially the same voltage as said B-battery when the latter is substantially fully charged whereby the counter E. M. F. of such charged B-battery substantially shuts off the charging current automatically when said B-battery is fully charged without electrical disconnection of said alternating current from said rectifier; and means operable to close the B-battery charging circuit only after first opening the circuit including such filament and heating means.

In testimony whereof, I affix my signature.
RAYMOND C. BENNER.